United States Patent Office.

CARLETON B. HUTCHINS, OF ANN ARBOR, MICHIGAN.

Letters Patent No. 93,304, dated August 3, 1869.

IMPROVED COMPOSITION FOR ROOFING AND PAINT.

The Schedule referred to in these Letters Patent and making part of the same.

*To all whom it may concern:*

Be it known that I, CARLETON B. HUTCHINS, of Ann Arbor, in the county of Washtenaw, in the State of Michigan, have invented a new and improved Composition for Roofing and Paint; and I do hereby declare that the following is a full and exact description thereof.

The nature of my invention consists in the compounding of different ingredients, hereafter named.

To enable others skilled in the art to compound and use my invention, I will proceed to describe the compounding of the same.

I take one pound of pure rosin, one pint of pine or rosin-tar, three pounds of ground slate or marble, or ground stone of any kind, also clean gravel or sharp sand can be added, and, when compounded, I apply the same when hot to felting or canvas. I then cover the same, when partially cool, with coarse gravel. For paint, I omit the gravel and sand, and add linseed or cotton-seed oil, in sufficient quantity to render the composition of such a consistency that it may be applied with a brush.

Any of the before-named ingredients can be increased or diminished.

What I claim as my invention, and desire to secure by Letters Patent, is—

The compounding of ingredients, as herein described, to make a composition for roofing and paint.

C. B. HUTCHINS.

Witnesses:
   HARRY B. HUTCHINS,
   JOHN SAUNDERS.